United States Patent [19]

Ang et al.

[11] 4,222,615
[45] Sep. 16, 1980

[54] LOW VOLTAGE INHIBIT FOR ADAPTIVE BRAKING SYSTEM

[75] Inventors: Leoncio T. Ang; Bertice E. Walker, Jr.; Robert E. Weber, all of Newport News, Va.

[73] Assignee: The Bendix Corporation, Southfield, Mich.

[21] Appl. No.: 858,933

[22] Filed: Dec. 9, 1977

[51] Int. Cl.² .............................................. B60T 8/00
[52] U.S. Cl. ........................................ 303/92; 340/53
[58] Field of Search ................... 303/20, 92, 103; 340/52 B, 53, 62

[56] References Cited

U.S. PATENT DOCUMENTS

| | | | |
|---|---|---|---|
| 3,874,743 | 4/1975 | Fleischer et al. | 303/92 |
| 3,995,912 | 12/1976 | McNinch, Jr. et al. | 303/92 |
| 4,009,914 | 3/1977 | Sato et al. | 303/92 |
| 4,013,324 | 3/1977 | Quon | 303/92 |
| 4,049,326 | 9/1977 | Zobel | 303/92 |
| 4,057,299 | 11/1977 | Jones | 303/92 |
| 4,061,402 | 12/1977 | Peterson et al. | 303/92 |
| 4,120,539 | 10/1978 | Carp et al. | 303/20 X |

Primary Examiner—Trygve M. Blix
Assistant Examiner—Reinhard J. Eisenzopf
Attorney, Agent, or Firm—Ken C. Decker; William N. Antonis

[57] ABSTRACT

An adaptive braking control circuit and a solenoid valve actuated by the control circuit is protected by a fuse which is blown when a malfunction of the solenoid exists. However, if the voltage produced by the vehicle electrical supply falls below a predetermined level insufficient to actuate the solenoid valve, the adaptive braking control circuit is disabled without blowing the fuse. A control circuit is provided which senses a malfunction in the solenoid, and which generates a fuse blowing signal which is used to actuate a silicon controlled rectifier (SCR) in order to blow the fuse. However, under the low voltage condition, this fuse blowing signal is inhibited.

14 Claims, 5 Drawing Figures

LOW VOLTAGE INHIBIT FOR ADAPTIVE BRAKING SYSTEM

BACKGROUND OF THE INVENTION

This invention relates to an adaptive braking system for a fluid pressure operated vehicle braking system, and, more particularly, to a failure detection circuit for such an adaptive braking system which senses a malfunction of the electrically actuated solenoid valve and blows a fuse when such a malfunction occurs. However, if the malfunction is due solely to a decrease in the voltage produced by the vehicle electrical supply to below a predetermined level, the fuse is not blown and the adaptive braking control circuit is disabled temporarily until the low voltage condition no longer exists.

Governmental regulations require, as a practical matter, that all air braked vehicles be equipped with an adaptive braking control system. However, these governmental regulations also require that, in case of a malfunction of the control system, that the normal effectiveness of the vehicle fluid pressure braking system not be deprecated, and that the control system not exert an inordinate drain on the vehicle electrical supply system. Since there are potential failures, such as a shorted solenoid valve, which might result in an inordinate drain of the vehicle electrical supply, and since there are other failure modes, such as the solenoid valve being actuated continuously, which may result in failure or reduced effectiveness of the normal vehicle fluid pressure braking system, adaptive braking systems, particularly those used on semi-trailers, must be protected by a fuse which is blown if one of the aforementioned malfunctions occurs. However, there are other types of malfunctions in which it may appear that the solenoid is malfunctioning, but the malfunction of the solenoid is due only to a reduced voltage output from the vehicle electrical power supply. This decreased voltage may be a purely transitory phenomena, as might occur when the vehicle engine is cranked for a sufficiently long time with a weak battery while the vehicle operator effects a brake application. Since the vehicle stoplight switch, which is actuated by a brake application, enables the vehicle adaptive braking system, and since during cranking of the engine, a self-test function is performed on the adaptive braking system, it is possible for the low voltage condition caused by an old battery and sufficiently long engine cranking to cause a failed condition of the solenoid. Since this failed condition is due to lack of sufficient electrical power, and since this may be a purely transitory phenomena, it is undesirable to blow a fuse under these circumstances, although it is desirable that the adaptive braking system be disabled until the low voltage condition no longer exists.

SUMMARY OF THE INVENTION

Therefore, an important object of our invention is to provide a circuit for a vehicle control solenoid such as an adaptive braking system, which is responsive to a failure in the solenoid valve controlling fluid pressure communication to the vehicle's brakes to blow a fuse protecting the circuit when such a malfunction exists.

Another important object of our invention is to provide a circuit in a vehicle control device, such as an adaptive braking system, which is responsive to a low voltage condition of the vehicle electrical power supply to prevent blowing of the aforementioned fuse protecting the control circuit when such a low voltage situation exists.

Still another important object of our invention is to provide a control circuit for an adaptive braking system which disables the system without blowing the fuse when the aforementioned low voltage condition exists.

DETAILED DESCRIPTION

Figure 1:
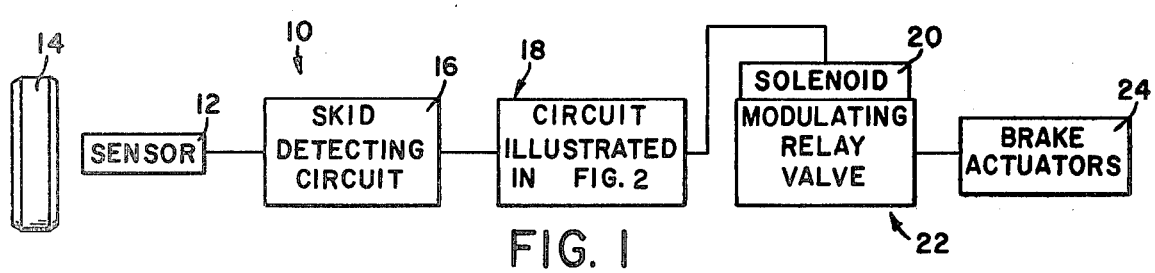
FIG. 1 is a diagrammatic illustration of an adaptive braking system made pursuant to the teachings of our present invention.

Referring now to the drawings, an adaptive braking system generally indicated by the numeral 10 includes a conventional wheel speed sensor 2 which is responsive to rotation of a vehicle wheel 14 to generate a speed signal which is a function of the rotational velocity of the wheel 14. The speed signal generated by the sensor 12 is transmitted to a skid detecting circuit generally indicated by the numeral 16. The skid detecting circuit may be of any type well known to those skilled in the art which is responsive to the speed signal generated by the sensor 12 to determine when an incipient skidding condition exists. For example, the skid detecting circuit 16 may be made pursuant to the teachings of U.S. Pat. No. 3,804,470, owned by the assignee of the present invention and incorporated herein by reference. Clearly, two or more sensors 12 sensing the wheel speed of different ones of the vehicle wheels may be connected through the appropriate selecting circuit to feed a single skid detecting circuit 16 without departing from the scope of this invention. The skid detecting circuit 16 generates a signal on the output terminal thereof when an incipient skidding condition exists and terminates this signal when the incipient skidding condition terminates. The skid detecting signal is transmitted to the input terminal of the circuit 18 illustrated in FIG. 2, which is responsive to the skid detecting signal to generate a brake pressure control signal which controls the solenoid actuator 20, which is a part of the modulating relay valve generally indicated by the numeral 22. The modulating relay valve 22 controls communication between the vehicle fluid pressure supply (not shown) and the brake actuators 24, to thereby release the fluid pressure level in the brake actuators when an incipient skidding condition exists, and to control brake pressure increase when the incipient skidding condition is terminated.

Figure 2:
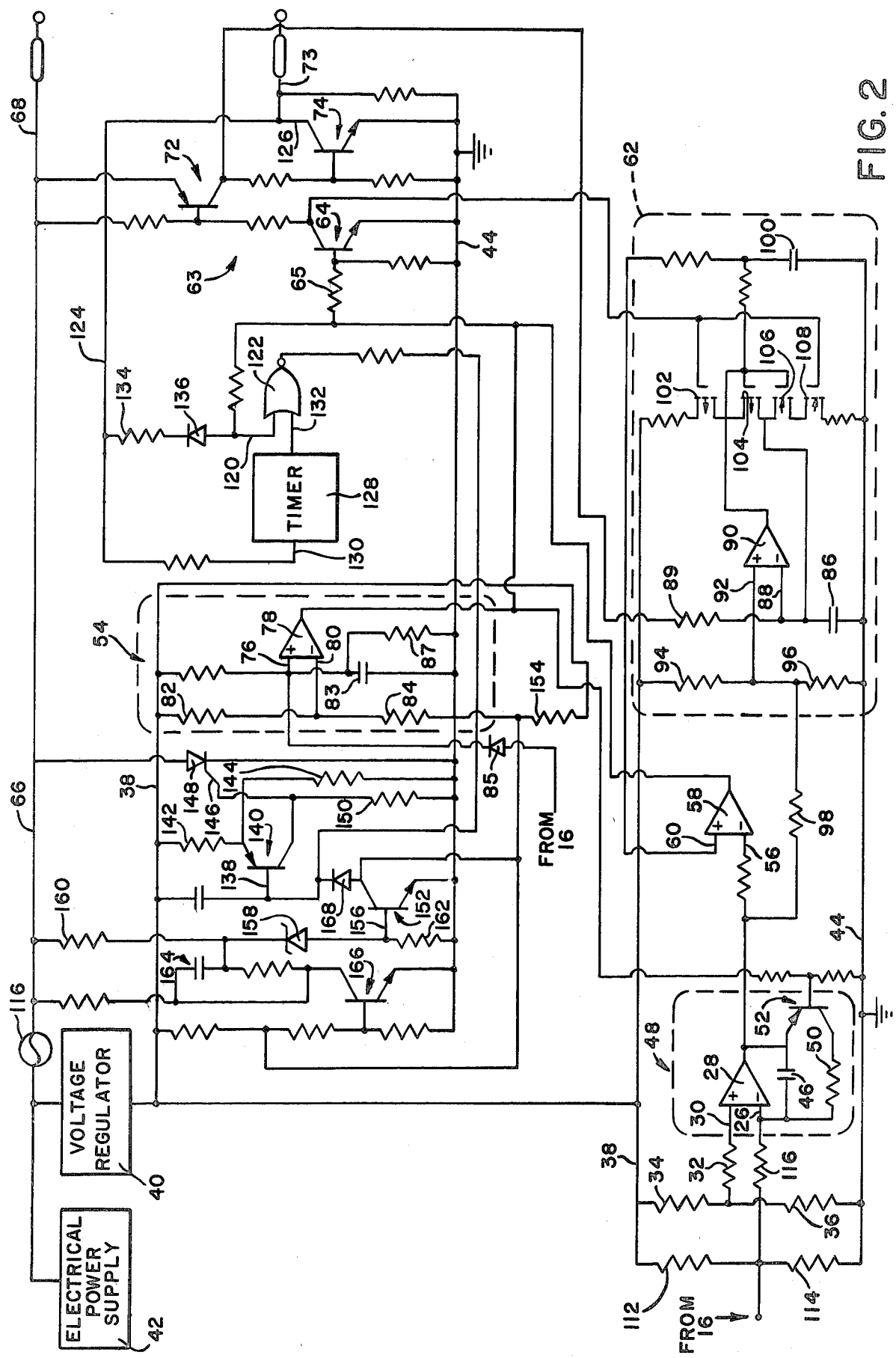
FIG. 2 is a detailed schematic illustration of a portion of the adaptive braking system illustrated in FIG. 1.

Referring now to FIG. 2 of the drawings, the inverting terminal 26 of an operational amplifier 28 is connected to the output of the terminal of the skid detecting circuit 16. The other terminal 30 of the operational amplifier 28 is connected to a predetermined voltage level established by voltage dividing resistors 32, 34, and 36 which are connected between the ground line 44 and a regulated voltage on line 38 generated by voltage regulator 40 and the vehicle electrical system 42. A capacitor 46 is connected around the operational amplifier 28, so that the operational amplifier 28, resistor 116, and capacitor 46 constitute an integrating circuit comprising the pressure command generator enclosed within the dash lines generally indicated by the numeral 48. As will be evident to those skilled in the art, the operational amplifier 28 and capacitor 46 generate a downwardly ramping signal when the value of the signal on the terminal 26 exceeds that on the terminal 30, and generate an upwardly ramping signal when the value of the signal on terminal 26 is less than the value of the signal on terminal 30. However, a resistor 50 is connected in parallel with the capacitor 46, and is switched into the circuit by a switching transistor generally indicated by the numeral 52. When the resistor 50 is switched into the circuit, the capacitor 46 is ineffective, and the operational amplifier 28 acts as a simple voltage follower. This output signal is equal in value to the reference signal on terminal 30. The switching transistor 52 is controlled by the initial condition/termination logic generally indicated by the numeral 54, which will be described in detail hereinafter. However, in general, the resistor 50 will be switched into the circuit at all times other than when the vehicle's braking system is controlled by the adaptive braking mechanism.

The output of the pressure command generator 48 is transmitted to the inverting input terminal 56 of a duty cycle comparator 58. The other terminal 60 of the comparator 58 is connected to the output of the model reference generator generally indicated by the numeral 62, which models the brake pressure in the vehicle brake actuators and which generates an output signal proportional thereto which is transmitted to the terminal 60. Details of the construction and operation of the model reference generator 62 will be described in detail hereinafter. The duty cycle comparator 58 generates an output signal whenever the value of the signal on the terminal 60 is greater than that on the terminal 56. This output signal is transmitted to the solenoid driver circuit generally indicated by the numeral 63.

The solenoid driver circuit 63 includes a predriver transistor 64, the base of which is connected through resistor 65 to the output of the operational amplifier 58 so that, when the operational amplifier 58 generates an output signal, the transistor 64 is turned on, thereby completing the circuit between power line 66, which is connected to terminal 68 of the solenoid 20 and to the ground line 44. The base electrode of transistor 64 is also connected directly to the terminal of skid detecting circuit 16, so that transistor 64 also turns on whenever a skid detecting signal is generated. When transistor 64 turns on, preamplifier transistor 72 also turns on, which actuates transistor 74 to connect the ground line 44 with terminal 73 of the solenoid 20. Consequently, the solenoid 20 turns on to initiate a brake pressure decrease when the duty cycle comparator 58 generates an output signal or when a skid detecting signal is generated.

The signal transmitted to the base electrode of transistor 64 is also connected to the positive terminal 76 of a comparator 78 which is a part of the initial condition/termination logic generally indicated by the numeral 54. The inverting terminal 80 of the comparator 78 is normally connected to a fixed voltage level established by the voltage produced by the voltage regulator dividing resistors 82 and 84. However, as will be explained in detail hereinafter, under certain conditions in which the voltage produced by the power supply 42 is less than a predetermined level, the bias on terminal 80 is changed to a higher level. Consequently, whenever the value of the signal on the terminal 76 exceeds the value on the terminal 80, the comparator 78 generates an output signal which is transmitted to transistor 52 to turn the latter off to switch the resistor 50 out of the circuit. The signal on terminal 76 is also used to charge capacitor 83, and a diode 85 is provided to prevent the signals in the initial condition/termination logic 52 from affecting the solenoid driver circuit 62. A discharge circuit consisting of a resistor 87 is provided for the capacitor 83, and the values of the capacitor 83 and resistor 87 are such that the time constant of the capacitor 83 is several seconds, which is far greater than the maximum time between commands turning on the solenoid 20 during adaptive control of the vehicle brakes. Therefore, once the solenoid 20 is turned on when adaptive control of the vehicle's brakes is initiated, the capacitor 83 holds terminal 76 higher than terminal 80 until several seconds after control is no longer necessary.

Figure 4:
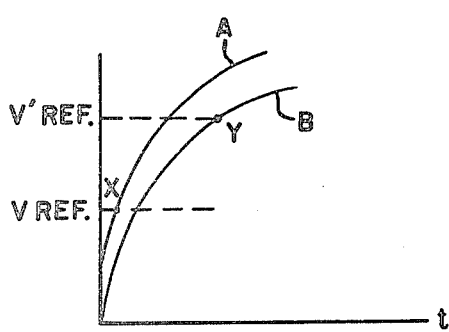
FIGS. 4 and 5 are graphical representations of the signal values generated by the model reference generator used in the adaptive braking system illustrated in FIGS. 1 and 2.

The model reference generator generally indicated by the numeral 62 will now be described in detail. The generator 62 includes a capacitor 86 which is connected through resistor 89 to the solenoid predriver transistor 72 and to ground line 44. Consequently, when the transistor 72 turns on when the duty cycle comparator 58 generates an output signal, the capacitor 86 will be charged by the voltage on line 66, which is the same voltage that electrically actuates the solenoid. Since the line 66 is connected directly to the vehicle electrical system 42, the voltage charging capacitor 86 will vary depending upon the condition of the electrical system. Consequently, on a warm day with a new battery the capacitor 86 will charge reasonably quickly, as indicated by curve A on FIG. 4. However, on a cold day with an older battery, so that the voltage level in 66 is reduced, the capacitor 86 will charge more slowly, as presented by curve B on FIG. 4. Since the same voltage also electrically actuates the solenoid, the time required for the current in the solenoid coil to build to a level sufficient to move the armature will also vary as a function of the voltage on line 66. Consequently, the time required to charge capacitor 86 to a predetermined level models the time required to electrically actuate the solenoid. Capacitor 86 is connected to the inverting terminal 88 of a comparator 90, the positive terminal 92 of which is connected to a reference voltage established by the voltage dividing resistors 94 and 96. The voltage level on terminal 92 also varies with the output of the pressure command generator, which is transmitted to the terminal 92 through the resistor 98. Therefore, the voltage level transmitted to terminal 92 will be increased at high pressure command levels generated by the command generator 48, and will be reduced at low pressure command levels generated by the pressure command generator 48. Consequently, the model reference generator 62, in addition to compensating for the opening and closing times of the solenoid due to variations in voltage, also compensates for the difference in solenoid response times caused by the differences in pressure levels at the solenoid. Therefore, again referring to FIG. 4, when the pressure level as commanded by the pressure command generator 48 is relatively high, comparator 90 compares the voltage across the capacitor 86 with a higher reference value represented by $V'_{Ref}$. At a lower commanded pressure level, comparator 90 compares the voltage across the capacitor 86 with a lower pressure level represented by $V_{Ref}$. Therefore, the comparator 90 will turn on much more quickly, as illustrated by point X in FIG. 4, when a new battery is used and the commanded pressure level is relatively low, and more slowly when an older battery is used on a cold day and the commanded pressure level is relatively high, as illustrated by point Y of FIG. 4. Consequently the output of comparator 90 accounts for variations in the reaction time of the solenoid due to the strength of the battery and due to the commanded pressure levels at the solenoid. The output of the comparator 90 charges a capacitor 100. The signal on this capacitor 100 is the pseudo-feedback signal which is transmitted to the input terminal 60 of the comparator 58. Therefore, the voltage across the capacitor 100 models the pressure level in the brake actuators quite closely.

In order to be accurate, it is necessary that the capacitor 86 be charged and discharged from the same level during each antiskid cycle. For this reason, field effect transistors 102, 104, 106, and 108 are connected in series between the supply line 38 and the ground line 44. The gate electrodes of the transistors 102 and 108 are connected to the transistor 64 so that transistor 102 turns on when the solenoid 20 is actuated and turned off when the solenoid is not actuated. Conversely, the transistor 108 turns on when the solenoid turns off, and turns off when the solenoid turns on. The gate electrodes of the transistors 104 and 106 are connected to the output of the model reference comparator 90. Therefore, transistor 104 turns on when the output of the comparator 90 is low and turns off when the output is high, and transistor 106 turns on when the comparator 90 is high and turns off when it is low. The common terminal between the transistor 104 and the transistor 106 is connected to the capacitor 86, so that the capacitor 86 will be connected directly to the voltage level on line 38 when the transistors 102 and 104 are both turned on, i.e., when the solenoid 20 is turned on and the output of the comparator 90 is low. Similarly, the capacitor 86 will be connected to a ground on line 34 when the transistors 106 and 108 are turned on, i.e., when the solenoid 20 is turned off and when the output of the comparator 90 is high.

Figure 5:
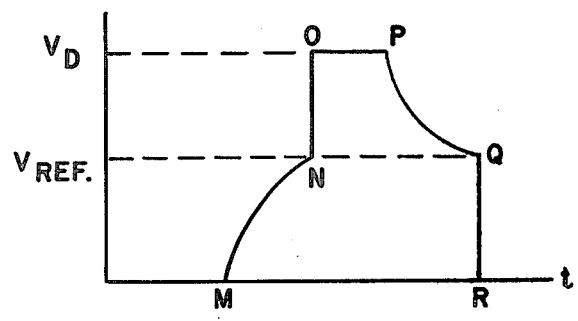

The operation of the transistors 102, 104, 106, and 108 is illustrated graphically in FIG. 5. In FIG. 5, the $V_{Ref}$ voltage level is the appropriate voltage level transmitted to the positive input terminal of the model reference comparator 90. As illustrated in FIG. 5, the capacitor 86 is charged exponentially, represented by the line segment M-N, after a command is transmitted to the solenoid driver 62 and before the comparator 90 switches. This segment represents the time delay in actuating the solenoid 20 after a command is transmitted to the solenoid driver 62. This time delay, as discussed hereinabove, is due to the time required for the current to build up in the solenoid coil, and is due to the time delay inherent in the actuation of the mechanical components of the modulator, which is a function of the pressure level in the modulator. At time N in FIG. 5, transistors 102 and 104 are both on, thereby connecting the capacitor 86 directly to the voltage on the line 38. The capacitor 86 is then almost instantaneously charged to this voltage level, as represented by line segment N-O in FIG. 5. At time P in FIG. 5, the command to the solenoid driver 62 is removed, and the capacitor 86 decays exponentially in the time period P-Q on FIG. 5. This time delay represented by the discharge of the capacitor 86 is due to time delays required to release the solenoid, which are similar to the time delays required to actuate the solenoid described hereinabove. At time Q in FIG. 5, the comparator 90 switches, turning on the transistor 106 to connect the capacitor with the ground on line 44. Consequently, the capacitor 86 thereupon discharges almost instantaneously, as represented by line segment Q-R in FIG. 5, so that the capacitor 86 is ready to be charged again when a new command is transmitted to the solenoid driver circuit 62.

Referring now to the low voltage inhibit circuit, a fuse 116 is installed in the power line 66 which connects the terminal 68 with the vehicle electrical power supply 42. The base electrode of transistor 64 is connected to an input terminal 120 of a Nor gate 122. Terminal 120 of Nor gate 122 is also connected to a line 124 which connects the collector 126 of transistor 74, which, as discussed hereinabove, controls actuation of the solenoid, with the input of a timer 128. The timer 128 is of conventional construction and generates an output signal a predetermined time period after a signal is received on the input terminal 130 thereof through the line 124. The output of the timer 128 is connected to the other terminal 132 of the Nor gate 122. Terminal 120 of Nor gate 122 is connected to the lne 124 through resistor 134 and diode 136.

The output of the Nor gate 122 is connected to the base electrode 138 of a transistor 140. The transistor 140 transmits a voltage level established by the voltage dividing resistors 142 and 144 which are connected between the power line 38 and ground line 44 with the gate electrode 146 of a silicon control rectifier (SCR) 148. The SCR 148 is connected between the power line 66 and the ground line 44, so that when gating current is transmitted to gate electrode 146 the SCR short circuits the power line 66 to the ground line 44, to thereby blow the fuse 116. When transistor 140 turns on, the voltage established at the junction of resistors 142, 144 and the emitter of transistor 140 is transmitted to the gate 146, thereby blowing the SCR 148 to connect the power lines 118 and the ground line 44 as described hereinabove. A conventional ballast resistor 150 is connected between the gate electrode 146 and the ground line 44, as will readily be appreciated as necessary by those skilled in the art.

As discussed hereinabove, the voltage level at the inverting terminal 80 of operational amplifier 78 is normally fixed voltage level established by voltage dividing resistors 82 and 84. Resistor 84 is normally connected to the ground line 44 through a transistor 152. Therefore, the voltage level at the negative terminal or inverting terminal 80 will be a predetermined drop less than the voltage level on line 38, thereby permitting a high signal from the skid detecting circuit 16 to cause the comparator 78 to generate an output signal to turn on the transistor 52 to thereby initiate adaptive control of the vehicle's brakes by pressure command generator 28. However, resistor 84 is also connected directly to the power line 38 through another resistor 154. Therefore, when transistor 152 is turned off, the voltage level at inverting terminal 80 is substantially that of the regulated voltage line 38, thereby making it impossible for the comparator 78 to generate an output signal even when a signal is transmitted to the positive terminal 76 from the skid detecting circuit 16.

The base electrode 156 of the transistor 152 is connected to the anode of a zener diode 158 which is connected between the power line 118 and the ground line 44 through the appropriate ballast resistors 160 and 162. As long as the voltage drop across the zener diode 158 is above a predetermined level, the zener diode 158 conducts to transmit a signal to the base electrode 156 of the transistor 152. A conventional hysteresis circuit 164 is connected to the cathode of zener diode 158. The hysteresis circuit 164 is a typical RC circuit with a predetermined time constant which maintains a relatively high voltage level across the zener diode 158 to accommodate momentary fluctuations in the power level in the line 118, as might occur during actuation of the aforementioned solenoid valve during normal operation of the adaptive braking circuit. Obviously, it is undesirable to disable the adaptive braking circuit due to such momentary fluctuations, and the hysteresis circuit 164 prevents such disablement by maintaining, for a very brief period of time, the required voltage drop across the zener diode 158. The hysteresis circuit 164 is controlled by a transistor 166 which is controlled, in turn, by the transistor 152, so that when the transistor 152 turns off, the transistor 166, the base electrode of which is connected to the transistor 152 through appropriate voltage dividing resistors, will turn on, thereby grounding the hysteresis circuit 164 to remove the temporary voltage drop across the zener diode 158.

MODE OF OPERATION

Figure 3:
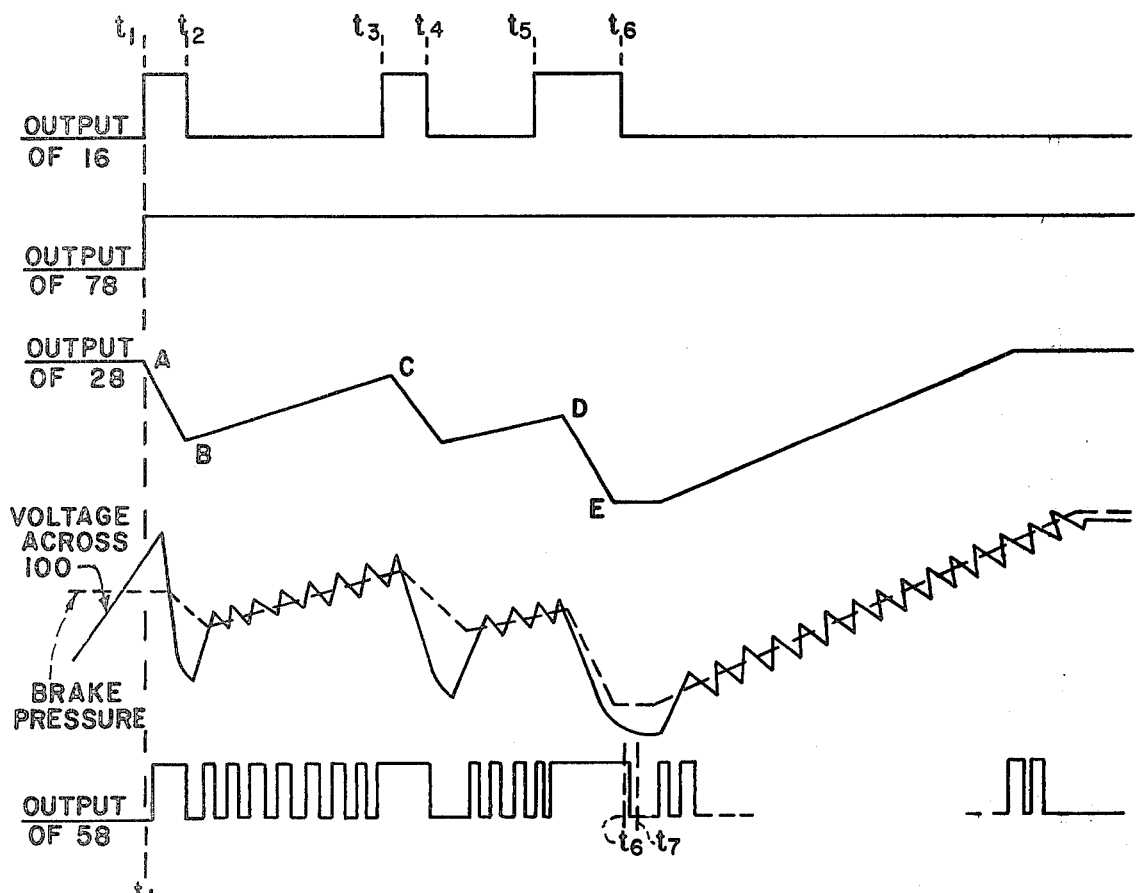
FIG. 3 is a graphical representation of the values of the various signals generated within the circuit illustrated in FIG. 2 at various times during the operation of the adaptive braking system.

When the skid detecting circuit 16 senses an incipient skidding condition of the vehicle wheels, circuit 16 generates an output signal which is transmitted directly to the base electrode of the transistor 64 in the solenoid driver circuit 62. This signal, as described hereinabove, turns on the solenoid 20 to effect a brake pressure reduction. At the same time, this signal is also transmitted to the positive input terminal 76 of comparator 78 in the initial condition/termination logic 54. Since the value of the signal in the positive input terminal 76 of comparator 78 is now greater than the signal on the negative input terminal 80, comparator 78 generates at output signal which turns off the transistor 52, to thereby switch the resistor 50 out of the circuit. Before the transistor 52 is turned off, the operational amplifier 28 acts as a simple voltage follower, so that the signal on the output terminal thereof is equal to the reference signal applied to the positive input terminal 30 of the operational amplifier 28. Consequently, when the transistor 52 is turned off to switch the resistor 50 out of the circuit, the initial value of the pressure command generator is equal to the reference value on the input terminal 30. After resistor 50 is switched out of the circuit, the circuit 48 acts as an integrator. The negative terminal 26 of the operational amplifier 28, as discussed hereinabove, is also connected directly to the output terminal of th skid detecting circuit 16, so that when the transistor 64 is turned on, the signal transmitted to the negative input terminal 26 causes the output of the operational amplifier 28 to ramp downwardly. As illustrated graphically in FIG. 3, at time t₁ the skid detecting circuit generates an output circuit as illustrated by the uppermost graph in FIG. 3. As illustrated by the second graph in FIG. 3, the generation of the initial output signal of the skid detecting circuit 16 causes the output of comparator 78 to switch high and to remain high until adaptive control terminates, since the capacitor 83 is charged by the output signal generated by the skid detecting circuit. At time t₁, as represented by the third graph in FIG. 3, the output of the pressure command generator 48 ramps downwardly, as illustrated by line segment AB in FIG. 3. At time t₂, the output of the skid detecting circuit 16 terminates, indicating that the wheel is no longer in imminent danger of locking, so that a pressure build cycle may be initiated. When this occurs, the operational amplifier 28 switches, so that its output begins to ramp upwardly as indicated by line segment BC in FIG. 2. This operation of the pressure command generator continues for an indefinite number of cycles as illustrated in FIG. 3.

As described hereinabove, the signal on the capacitor 100 represents the actual pressure level in the brake actuators. The signal on the capacitor 100, as discussed hereinabove, is a function of the output of the pressure command generator which is a function of the desired or commanded pressure level in the vehicle's brake actuators, and also a function of the time delays required to open and close the solenoid.

After the initial command to the solenoid driver circuit 62 to thereby effect a brake pressure reduction, the capacitor 100 will continue to be charged, since the output of the comparator 90 will remain high until the value of the signal on the capacitor 86, which begins charging when the solenoid valve is actuated, becomes greater than the value of the signal on terminal 92. The comparator 90 then switches, thereby permitting the charge across the capacitor 100 to decrease, to thereby model the brake pressure reduction taking place when the solenoid valve is actuated. This time delay after generation of a signal commanding a brake pressure reduction before the charge on capacitor 100 decreases represents the aforementioned solenoid time delays required to actuate the modulator. As discussed hereinabove, the time period that the capacitor 100 continues to charge after the solenoid is actuated is represented by line segment MN in FIG. 5. Similarly, the capacitor 100 will continue to discharge for a time period after the command to the solenoid driver circuit is removed. This time delay is represented by line segment P-Q in FIG. 5. As discussed hereinabove, the time delays represented by line segments MN and PQ in FIG. 5 represent the times required for actuation and release of the solenoid. The value of the signal on the capacitor 100 is the pseudo-feedback signal approximating the brake pressure in the brake actuators and is represented by the solid line in the fourth graph of FIG. 3. The nominal values of the actual brake pressure is represented by the dashed line in this graph. The feedback signal if fed to the positive terminal of the duty cycle comparator 58, where it is compared with the output of the pressure command generator 48. On a build cycle, the output of the pressure command generator ramps upwardly, as illustrated in the line B-C in the third curve on FIG. 3. The duty cycle translator compares this upwardly ramping signal with the signal across the capacitor 100, the pseudo-pressure feedback signal, and generates the signal actuating solenoid 20 so that pulsating commands, represented, as best illustrated in the lowermost graph of FIG. 3, to control the rate of brake pressure increase to that commanded by the output of the pressure command generator 48, which is less than what the brake pressure increase would be if uninhibited communication was permitted to the vehicle's brakes. As discussed hereinabove, this unlimited rate of brake pressure increase, due to the size requirements of the various components of the modulator 22 required by Federal regulations to provide a satisfactory response time when adaptive braking control is not required would permit the brakes to lock before the adaptive braking system has a chance to react if this uninhibited build rate were permitted during adaptive control of the vehicle's brakes.

There are instances, such as when the vehicle is operated on an extremely slippery surface such as glare ice, that a brake pressure increase cycle must be overridden when the skid detecting signal terminates. If a brake pressure increase were initiated at this time, the vehicle's wheels would lock before the adaptive braking system has a chance to react. Consequently, a delay is provided which is responsive to operation of the vehicle on this type of extremely slippery surface which prevents initiation of a brake pressure increase until the vehicle's brakes have a chance to further recover from the imminent locking condition which caused initiation of adaptive braking. This situation is illustrated in the time segment T5–T6 in FIG. 3. As illustrated in FIG. 3, during this time segment the output of the skid detecting circuit has remained on for an unusually long time, indicating operation of the vehicle on an extremely slippery surface. As indicated in the line segment DE, the output of the pressure command generator 48 has remped downwardly to its lowest permissible point. Since all voltages in the logic schematic are positive, this lowest possible point is theoretically zero but actually is slightly higher than this level. As indicated at point E in curve C of FIG. 3, the output of the pressure command generator 48 has attained this lowest permissible value before the output of the skid detecting circuit 16 terminates. Since an input is still transmitted to the negative terminal 26 of operational amplifier 28, and since the output of the operational amplifier 28 can go no lower, the capacitor 46 charges at an exponential rate for as long as the output of the skid detecting circuit 16 remains. When the output of the skid detecting circuit terminates, the capacitor 46 discharges through the discharge network comprising resistors 112, 114 and 116. Even though the output signal of the skid detecting circuit terminates, the output of the pressure command generator 48 will not begin ramping upwardly until the capacitor 46 discharges to a level so that the value of the signal on terminal 26 is less than that on the terminal 30. Consequently, since brake pressure increase is controlled by the output of the pressure command generator, the brake pressure decay cycle will continue after termination of the output of the skid detecting circuit until the capacitor is discharged to the aforementioned level. This continuation of the brake pressure cycle is represented by time segment $t_6$–$t_7$ in FIG. 3. Consequently, on very slippery roads, which cause the skid detecting circuit to generate an output signal for an unusually long time, the subsequent build cycle is delayed for a timed period which is function of the time period that the pressure command generator remains at its lowest value. Therefore, adaptive braking circuit 10 is inherently able to compensate for operation of the vehicle on these extremely slippery surfaces, which if normal adaptive control were permitted, would cause locking of the vehicle's wheels.

Referring now to the failure and low voltage detection circuits, as discussed hereinabove, the solenoid 20 is actuated when transistor 74 is turned on, to thereby connect terminal 73 of the solenoid 20 with the ground line 44. Of course, the transistor 74 is turned on when the transistor 64 is turned on. When transistor 74 is turned on, the line 124 is also connected to ground at the ground line 44, so therefore the terminal 120 of Nor gate 122 is maintained in its low state, since the terminal is connected to ground by the line 124. Similarly, terminal 132 is also low after the solenoid 20 is fired, because the timer 128 resets each time a low signal is transmitted to the input terminal 130 thereof. Since the timer period of timer 128 is several seconds, much greater than the normal time that the solenoid 20 would be actuated during normal operation of the vehicle adaptive braking system, the signal at terminal 132 will also normally be low. Therefore, during normal operation of the adaptive braking system, the signal at the output terminal of the Nor gate 122 will be high, thereby maintaining the transistor 140 in its off condition. However, in the case of a shorted solenoid, the terminal 73 cannot be connected to ground even though the transistor 74 turns on, and therefore the line 124 will be high if the solenoid coil is shorted. Therefore, when the transistor 64 is turned on when a command is generated to the solenoid, the terminal 120 of the Nor gate 122 will go high, because it will be connected to the high signal at the base electrode of the transistor 64, and since the line 124 is also high in this condition. Therefore, the output terminal of the Nor gate 122 will go low if this occurs. Similarly, if the timer period of timer 128 expires, indicating that the valve 20 has been turned on for an inordinately long time, the output terminal of the Nor gate 122 will also go low. If both the timer expires and the solenoid is shorted, the output of Nor gate 122 will remain low, as is obvious to those skilled in the art. When the output of the Nor gate 122 goes low, transistor 140 is turned on, thereby transmitting a gating current to gate electrode 146 of the SCR 148 to blow the latter, thereby short-circuiting the power line 66 and blowing the fuse 116.

As pointed out hereinabove, it is not desirable to blow the fuse 116 if a low voltage condition exists. When such a low voltage condition exists, the zener diode 158 stops conducting, thereby causing the base electrode 156 of transistor 152 to go low, thereby turning off the transistor 152. When this occurs, as also discussed hereinabove, the voltage level at terminal 80 of comparator 78 is substantially the regulated voltage on line 38, thereby preventing the comparator 78 from generating an output signal to initiate adaptive control of the vehicle's brakes. Since the connection between the resistors 84 and ground is now broken when transistor 152 turns off, there is no voltage drop across the transistors 82, 84 and 154, thereby maintaining substantially the voltage on line 38. This voltage on line 38 is also conducted through the diode 168 to the base electrode 138 of the transistor 140, thereby keeping the latter turned off, so that no gating current can be transmitted to the SCR 148 regardless of the state of the Nor gate 122. As discussed in detail hereinabove, when transistor 152 turns off, the transistor 166 will turn on, thereby grounding the hysteresis circuit 164, to prevent the zener diode 158 to become conductive. Therefore, when a low voltage condition exists, the transistor 140 remains in its off condition to thereby prevent blowing of the fuse 116, and the comparator 78 is prevented from generating an output signal to turn on the transistor 152, thereby preventing the pressure command generator 28 from generating a pressure command signal which would have initiated a signal to the solenoid 20. At all other times, however, the transistor 140 is controlled by the Nor gate 122, so if the solenoid 20 malfunctions, the SCR 148 is able to blow the fuse 116.

We claim:

1. In a vehicle having a voltage source and a wheel, a brake controlling said wheel, and fluid pressure responsive means for actuating said brake, an adaptive braking system controlling communication to said fluid pressure responsive means comprising speed sensing means for generating a speed signal as a function of the rotational velocity of said wheel, means responsive to said speed signal for generating a skid detecting signal when an incipient skidding condition of said wheel exists, means responsive to said skid detecting signal for generating a brake pressure command signal, means responsive to said brake pressure command signal for controlling fluid communication to said fluid pressure responsive means, means responsive to the voltage generated by said voltage source to inhibit said brake pressure command signal when the voltage generated by said voltage source drops below a predetermined level, and comparing means comparing said skid detecting signal with a fixed reference signal and generating a control signal when the skid signal and the fixed reference signal are in a predetermined relationship with one another, said control signal enabling said brake pressure command signal generating means to generate the brake pressure command signal in response to said skid signal, said voltage source responsive means changing the value of said fixed reference signal when the voltage produced by said source drops below said predetermined level to thereby prevent generation of the control signal.

2. The invention of claim 1:
wherein said voltage source generates an unregulated voltage, and a voltage regulator generating a regulated voltage from the unregulated voltage generated by said source, said means for controlling fluid communication being powered by said unregulated voltage, said voltage source responsive means including means for measuring said unregulated voltage and swich means for changing the value of said fixed reference signal, said switch means being operated by said means for measuring said unregulated voltage when a low voltage condition of said unregulated voltage exists.

3. The invention of claim 1:
and a hysterisis circuit connected to said unregulated voltage measuring means to prevent the latter from operating said switch means for a period of time after the unregulated voltage drops below a predetermined level, but permitting said unregulated voltage measuring means to operate the switch means after said period of time expires.

4. The invention of claim 3:
wherein said unregulated voltage measuring means is a zener diode.

5. The invention of claim 2:
wherein said fluid communication controlling means includes an electrically actuated valve operated by said unregulted voltage, a fuse between said voltage source and said electrically actuated valve, means responsive to a malfunction of said electrically actuated valve for generating a signal for blowing said fuse, said switch means including means for preventing said fuse blowing signal from blowing said fuse when said low voltage condition exists.

6. The invention of claim 5:
and a hysterisis circuit connected to said unregulated voltage measuring means to prevent the latter from operating said switch means for a period of time the unregulated voltage drops below the predetermined level and permitting said unregulated voltage measuring means to operate the switch means after said period of time expires.

7. The invention of claim 5:
and a switch device responsive to said fuse blowing signal for causing a short circuit between said voltage source and ground in response to said fuse blowing signal to thereby blow said fuse, and means connecting said switch device to said switch means so that said switch means inhibits said fuse blowing signal when said low voltage condition exists.

8. In a vehicle having a voltage source for generating an unregulated voltage and a voltage regulator connected to said voltage source for generating a regulated voltage, an electrically actuated device operated by said unregulated voltage generated by said source, means for measuring the unregulated voltage, switch means operated by said unregulated voltage measuring means when the unregulated voltage is less than a predetermined level for disabling said electrically actuated device when a low voltage condition of said unregulated voltage exists, a hysterisis circuit connected to said unregulated voltage measuring means to prevent the latter from operating said switch means for a period of time after the unregulated voltage drops below the predetermined level and permitting said unregulted voltage measuring means to operate the switch means after said period of time expires, a fuse between said voltage source and said electrically actuated device, and means responsive to a malfunction of said electrically actuated device for generating a signal blowing said fuse, said switch means including means preventing said fuse blowing signal from blowing said fuse when said low voltage condition exists.

9. The invention of claim 8:
wherein said voltage responsive means is a zener diode.

10. The invention of claim 8:
and a switch device responsive to said fuse blowing signal for causing a short circuit between said voltage source and ground in response to said fuse blowing signal to thereby blow said fuse, and means connecting said switch device to said switch means to permit said switch means to inhibit said fuse blowing signal when said low voltage condition exists.

11. In a vehicle having a voltage source and a wheel, a brake controlling said wheel, and fluid pressure responsive means for actuating said brake, an adaptive braking system controlling communication to said fluid pressure responsive means comprising speed sensing means for generating a speed signal as a function of the rotational velocity of said wheel, means responsive to said speed signal for generating a skid detecting signal when an incipient skidding condition of said wheel exists, means responsive to said skid detecting signal for generating a brake pressure command signal, means responsive to said brake pressure command signal for controlling fluid communication to said fluid pressure responsive means, means responsive to the voltage generated by said voltage source to inhibit said brake pressure command signal when the voltage generated by said voltage source drops below a predetermined level, said voltage source generating an unregulated voltage, and a voltage regulator generating a regulated voltage from the unregulated voltage generated by said source, said means for controlling fluid communication being powered by said unregulated voltage, said voltage source responsive means including means for measuring said unregulated voltage and switch means for changing the value of said fixed reference signal, said switch means being operated by said means for measuring said unregulated voltage when a low voltage condition of said unregulated voltage exists.

12. The invention of claim 11:
and a hysterisis circuit connected to said unregulated voltage measuring means to prevent the latter from operating said switch means for a period of time after the unregulated voltage drops below a predetermined level, but permitting said unregulated voltage measuring means to operate the switch means after said period of time expires.

13. The invention of claim 11:
wherein said fluid communication controlling means includes an electrically actuated valve operated by said unregulated voltage, a fuse between said voltage source and said electrically actuated valve, means responsive to a malfunction of said electrically actuated valve for generating a signal for blowing said fuse, said switch means including means for preventing said fuse blowing signal from blowing said fuse when said low voltage condition exists.

14. The invention of claim 13:
and a switch device responsive to said fuse blowing signal for causing a short circuit between said voltage source and ground in response to said fuse blowing signal to thereby blow said fuse, and means connecting said switch device to said switch means so that said switch means inhibits said fuse blowing signal when said low voltage condition exists.

* * * * *